(12) United States Patent
Dinker et al.

(10) Patent No.: US 7,206,836 B2
(45) Date of Patent: *Apr. 17, 2007

(54) SYSTEM AND METHOD FOR REFORMING A DISTRIBUTED DATA SYSTEM CLUSTER AFTER TEMPORARY NODE FAILURES OR RESTARTS

(75) Inventors: Darpan Dinker, San Jose, CA (US); Pramod Gopinath, Union City, CA (US); Mahesh Kannan, San Jose, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 839 days.

(21) Appl. No.: 10/252,232

(22) Filed: Sep. 23, 2002

(65) Prior Publication Data

US 2004/0059805 A1   Mar. 25, 2004

(51) Int. Cl.
*G06F 15/173* (2006.01)
(52) U.S. Cl. .................... 709/224; 709/214; 709/220; 709/226
(58) Field of Classification Search ................ 709/214, 709/220, 224, 226
See application file for complete search history.

(56) References Cited

U.S. PATENT DOCUMENTS

| | | | |
|---|---|---|---|
| 5,454,108 A | 9/1995 | Devarakonda et al. |
| 5,634,122 A | 5/1997 | Loucks et al. |
| 5,666,486 A | 9/1997 | Alfieri et al. |
| 5,684,807 A | 11/1997 | Bianchini et al. |
| 5,812,780 A | 9/1998 | Chen et al. |
| 5,852,747 A | 12/1998 | Bennett et al. |
| 5,913,213 A | 6/1999 | Wikstrom et al. |
| 5,951,694 A | 9/1999 | Choquier et al. |
| 6,002,868 A | 12/1999 | Jenkins et al. |
| 6,006,259 A | 12/1999 | Adelman et al. |

(Continued)

OTHER PUBLICATIONS

"Concurrency Service Specification," Published Apr. 2000, Object Management Group.

(Continued)

*Primary Examiner*—Jeffrey Pwu
*Assistant Examiner*—Phuoc H Nguyen
(74) *Attorney, Agent, or Firm*—Robert C. Kowert; Meyertons, Hood, Kivlin, Kowert & Goetzel, P.c.

(57) ABSTRACT

Data stored within a cluster may be distributed among nodes each storing a portion of the data. The data may be replicated wherein different nodes store copies of the same portion of the data. In response to detecting the failure of a node, the cluster may initiate a timeout period. If the node remains failed throughout the timeout period, the cluster may copy the portion of the data stored on the failed node onto one or more other nodes of the cluster. If the node returns to the cluster during the timeout period, the cluster may maintain the copy of the data on the previously failed node without copying the portion of the data stored on the failed node onto any other nodes. By delaying self-healing of the cluster for the timeout period, an unbalanced data distribution may be avoided in cases where a failed node quickly rejoins the cluster.

31 Claims, 7 Drawing Sheets

U.S. PATENT DOCUMENTS

| | | | |
|---|---|---|---|
| 6,032,216 | A | 2/2000 | Schmuck et al. |
| 6,067,559 | A | 5/2000 | Allard et al. |
| 6,108,699 | A | 8/2000 | Moiin |
| 6,167,490 | A | 12/2000 | Levy et al. |
| 6,175,931 | B1 | 1/2001 | Hornung |
| 6,192,401 | B1 | 2/2001 | Modiri et al. |
| 6,249,879 | B1 | 6/2001 | Walker et al. |
| 6,324,492 | B1 | 11/2001 | Rowe |
| 6,449,734 | B1 * | 9/2002 | Shrivastava et al. ........ 709/219 |
| 6,477,172 | B1 | 11/2002 | Burger et al. |
| 6,480,473 | B1 | 11/2002 | Chambers et al. |
| 6,512,740 | B1 | 1/2003 | Baniewicz et al. |
| 6,522,995 | B1 | 2/2003 | Conti et al. |
| 6,532,494 | B1 | 3/2003 | Frank et al. |
| 6,567,808 | B1 | 5/2003 | Eschelbeck et al. |
| 6,430,355 | B1 | 6/2003 | Carberry et al. |
| 6,574,197 | B1 | 6/2003 | Kanamaru et al. |
| 6,591,295 | B1 | 7/2003 | Diamond et al. |
| 6,718,394 | B2 | 4/2004 | Cain et al. |
| 6,748,429 | B1 | 6/2004 | Talluri et al. |
| 6,748,554 | B2 | 6/2004 | Jin et al. |
| 6,801,937 | B1 | 10/2004 | Novaes et al. |
| 6,816,905 | B1 | 11/2004 | Sheets et al. |
| 6,820,210 | B1 | 11/2004 | Daruwalla et al. |
| 6,847,993 | B1 | 1/2005 | Novaes et al. |
| 6,895,401 | B2 | 5/2005 | Skinner et al. |
| 6,920,474 | B2 | 7/2005 | Walsh et al. |
| 6,928,378 | B2 | 8/2005 | Lebee et al. |
| 6,944,788 | B2 | 9/2005 | Dinker et al. |
| 6,961,769 | B2 | 11/2005 | Arora et al. |
| 6,965,936 | B1 * | 11/2005 | Wipfel et al. ................ 709/224 |
| 2001/0014097 | A1 | 8/2001 | Beck et al. |
| 2001/0027453 | A1 | 10/2001 | Suto |
| 2001/0040895 | A1 | 11/2001 | Templin |
| 2002/0042693 | A1 * | 4/2002 | Kampe et al. ............... 702/186 |
| 2002/0062372 | A1 | 5/2002 | Hong et al. |
| 2002/0073080 | A1 | 6/2002 | Lipkin |
| 2002/0143958 | A1 | 10/2002 | Montero et al. |
| 2002/0152307 | A1 | 10/2002 | Doyle et al. |
| 2003/0046394 | A1 * | 3/2003 | Goddard et al. ............. 709/226 |
| 2003/0061367 | A1 * | 3/2003 | Shah .......................... 709/230 |
| 2003/0120772 | A1 * | 6/2003 | Husain et al. ............... 709/224 |
| 2003/0131041 | A1 | 7/2003 | Dinker et al. |
| 2003/0154202 | A1 | 8/2003 | Dinker et al. |
| 2003/0204509 | A1 | 10/2003 | Dinker et al. |
| 2003/0204623 | A1 | 10/2003 | Cain |
| 2003/0204786 | A1 | 10/2003 | Dinker et al. |
| 2004/0044672 | A1 | 3/2004 | Spencer |
| 2004/0098490 | A1 | 5/2004 | Dinker et al. |
| 2004/0103098 | A1 | 5/2004 | Mitra |
| 2004/0162885 | A1 | 8/2004 | Garg et al. |
| 2004/0199815 | A1 | 10/2004 | Dinker et al. |

OTHER PUBLICATIONS

Devarakonda, Murthy et al., "Recovery in the Calypso Filesystem," ACM Transactions on Computer Systems, vol. 14, No. 3, Aug. 1996, pp. 287-310.

* cited by examiner

Cluster 100 :
During timeout after failure of Node D

Fig. 3

Cluster 100 :
After Data Replication

Fig. 4

Cluster 100 :
Node D rejoins cluster after timeout

SYSTEM AND METHOD FOR REFORMING A DISTRIBUTED DATA SYSTEM CLUSTER AFTER TEMPORARY NODE FAILURES OR RESTARTS

BACKGROUND OF THE INVENTION

1. Field of the Invention

The present invention relates to distributed data systems and, in particular, to handling temporary changes in membership within a distributed data system cluster.

2. Description of Related Art

Cooperating members, or nodes, of a distributed data system may form a cluster to provide transparent data access and data locality for clients, abstracting the possible complexity of the data distribution within the cluster away from the clients. Nodes may be servers, computers, or other computing devices. Nodes may also be computing processes, and thus multiple nodes may exist on the same server, computer, or other computing device.

A cluster may provide high availability by replicating data on one or more of the nodes included in the cluster. Upon failure of a node in the cluster, the cluster may repair the failure through a "self-healing" process to maintain high availability. The repair typically involves duplicating data that was stored on the failed node from a non-failed node, which also stores that data, onto another cluster node. Thus, the healing process ensures that a desired number of copies of the data remain in the cluster. For example, two cluster nodes may store duplicates of the same data. In response to the failure of one of these two nodes, the non-failed node may duplicate the data onto a third node to ensure that multiple copies of data remain in the cluster and to maintain high availability.

Healing may affect the distribution of data in the cluster nodes. For example, before a node failure, the data in a cluster is often distributed proportionately among the nodes to provide load balancing. The replication algorithm used to heal the cluster may distribute the data stored on the failed node among the failed node's neighboring nodes, resulting in uneven data distribution. To complicate matters even more, the failed node may return to the cluster relatively quickly (e.g., if the failure was due to transitory communication problems or a quick restart). However, once the healing process has been performed, it may be unduly complicated to return to the original even data distribution. As a result, if several temporary failures occur, the data distribution within the node may become so unbalanced that cluster performance suffers.

SUMMARY

Various systems and methods for recovering from a temporary node failure without performing a cluster topology self-healing process are disclosed. In one embodiment, a distributed data system includes a cluster, a client node configured to request access to data stored in the cluster, and an interconnect coupling the client node to the cluster. The cluster includes several nodes. Data stored within the cluster may be distributed among the nodes included in the cluster, and thus each node may store a portion of the data stored by the cluster. The data may also be replicated within the cluster so that different nodes store copies of the same portion of the data. In response to detecting the failure of a node included in the cluster, the cluster is configured to delay performing a self-healing process during a timeout period. If the node remains failed throughout the timeout period, the cluster is configured to perform the self-healing process by copying the portion of the data stored on the failed node onto one or more other nodes included in the cluster. If the node returns during the timeout period, the cluster is configured to maintain the portion of the data on the previously failed node instead of copying that portion of the data onto any other nodes.

An embodiment of a distributed data system cluster may include a first node configured to store a first data set, a second node that is also configured to store a copy of the first data set, and a third node. The first node is configured to copy the first data set onto the third node in response to detecting a failure of the second node. However, the first node is also configured to delay copying the first data set onto the third node during a timeout period initiated upon detection of the failure of the second node. If the second node returns to the cluster before expiration of the timeout period, the first node may not copy the first data set onto the third node and the second node may maintain its copy of the first data set.

One embodiment of a method of operating a cluster may involve: detecting a failure of a first node included in a distributed data system cluster; in response to detecting the failure, initiating a timeout period; in response to the timeout period expiring before the first node returns to the distributed data system cluster, replicating a portion of the data stored on the first node onto a second node included in the plurality of nodes; and in response to the first node returning to the cluster during the timeout period, maintaining the portion of the data on the first node instead of replicating the portion of the data onto the one or more other nodes.

In some embodiments, a node for use in a distributed data system cluster may include a communication interface, a data store, and a replication topology manager. The communication interface may be configured to send and receive communications from one or more other nodes, to detect a failed node within the distributed data system cluster, and to detect whether the failed node returns to the distributed data system cluster. In response to the communication interface detecting a failed node within the distributed data system cluster, the replication topology manager may initiate a copy operation for a portion of the data included in the data store if the failed node does not return to the distributed data system cluster before expiration of a timeout period. If instead the failed node returns to the distributed data system cluster before expiration of the timeout period, the replication topology manger is configured to not initiate the copy operation.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1A:
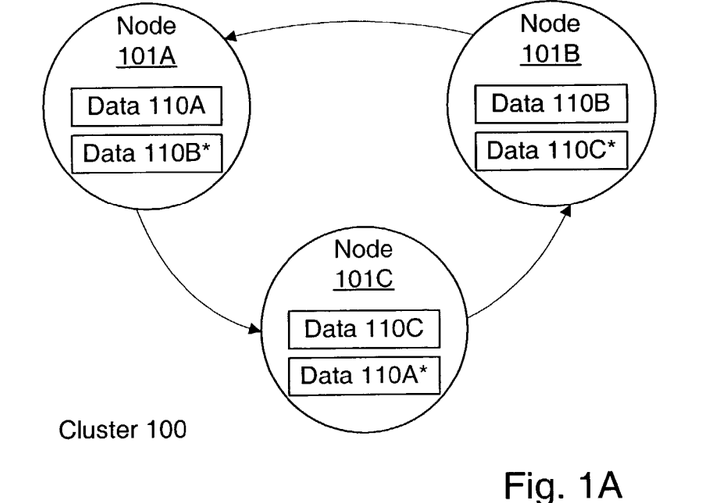
FIG. 1A illustrates a distributed data system cluster according to one embodiment.

FIG. 1A illustrates one embodiment of a cluster 100 that includes nodes 101A–101C. Cluster 100 is an example of a distributed data system cluster in which data is replicated on several nodes. As used herein, a "node" may be a stand-alone computer, server, or other computing device, as well as a virtual machine, thread, process, or combination of such elements. A "cluster" is a group of nodes that provide high availability and/or other properties, such as load balancing, failover, and scalability. For example, replicating data within a cluster may lead to increased availability and failover with respect to a single node failure. Similarly, subsets of a cluster's data may be distributed among several nodes based on subset size and/or how often each subset of data is accessed, leading to more balanced load on each node. Furthermore, a cluster may support the dynamic addition and removal of nodes, leading to increased scalability.

Nodes 101A–101C may be interconnected by a network of various communication links (e.g., electrical, fiber optic, and/or wireless links). Cluster 100 may span a large network or combination of networks (e.g., the Internet or a local intranet) in some embodiments. In other embodiments, a cluster 100 may include a computing device on which multiple processes are executing.

Cluster 100 stores data 110. Data 110 is subdivided into several data sets 110A–110C. In one embodiment, data sets 110A–110C may be (roughly) equally sized. For example, if the cluster 100 is storing 9 Mb of data 110 and cluster 100 includes 3 nodes 101, each data set may be approximately 3 Mb in size. As illustrated, data 110 is duplicated within cluster 100. Accordingly, each node 101 stores two different data sets. Note that in some embodiments, data may be subdivided into data sets according to a data file structure such that each data set includes one or more complete data files. Note also that other embodiments may replicate data more than once within a cluster (e.g., a cluster may include one primary copy and more than one backup copy of each replicated data set).

Data 110 may be physically replicated in several different storage locations within cluster 100. Storage locations may be locations within one or more storage devices included in or accessed by one or more servers, computers, or other computing devices. For example, if each node 101 is a separate computing device, each data set may be replicated in different storage locations included in and/or accessible to at least one of the computing devices. In another example, data may be replicated between multiple processes executing on the same server (e.g., each process may store its copy of the data within a different set of storage locations to which that process provides access). Storage devices may include disk drives, tape drives, CD-ROM drives, memory, registers, and other media from which data may be accessed. Note that in many embodiments, data may be replicated on different physical devices (e.g., on different disk drives within a SAN (Storage Area Network)) to provide heightened availability in case of a physical device failure.

The way in which data is replicated throughout cluster 100 may be defined by cluster 100's replication topology. A replication topology is typically a static definition of how data should be replicated within a cluster. The topology may be specified by use of or reference to node identifiers, addresses, or any other suitable node identifier. The replication topology may include address or connection information for some nodes.

In FIG. 1A, nodes 101A–101C implement a ring replication topology in which each node stores a backup copy of a data set stored on a "previous" node and sends communications to a "next" node. The directional arrows linking nodes 101A–101C indicate the relationship between a "previous" node (the node from which an arrow points) and a "next" node (pointed to by an arrow). The nodes to either side of a given node are that node's neighboring nodes. A node's neighbors may be virtual neighbors instead of physical neighbors. For example, two adjacent nodes in a replication topology may not be physically adjacent to each other. In general, nodes within a cluster may be configured according to various replication topologies, and thus the ring topology illustrated herein is merely exemplary. Note that throughout this disclosure, drawing features identified by the same numeral followed by a letter (e.g., nodes 101A–101C) may be collectively referred to using the numeral alone (e.g., nodes 101). Note also that in other embodiments, clusters may include different numbers of nodes than illustrated in FIG. 1A.

In the embodiment of FIG. 1A, node 101A adheres to the replication topology by storing a primary copy of data set 110A and a backup copy 110B* (the * notation indicates that a node's copy of that particular data set is a backup copy) of data set 110B for which the previous node 101B stores a primary copy. Similarly, node 101B stores a backup copy 110C* of data set 110C for which node 101C stores a primary copy, and node 101C stores a backup copy 110A* of data set 110A. A node storing a backup copy of a data set is referred to herein as a backup node for that data set. For brevity, a backup copy of a data set is referred to herein as a backup data set, and a primary copy of a data set is referred to as a primary data set.

Figure 1B:
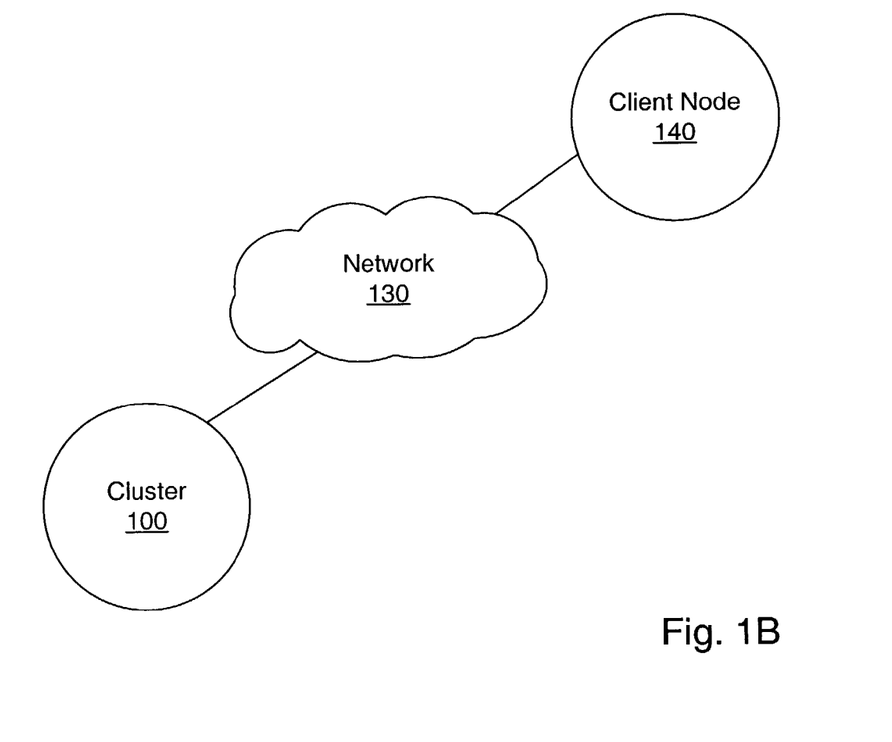
FIG. 1B illustrates a distributed data system according to one embodiment.

As shown in FIG. 1B, cluster 100 may be configured to interact with one or more external client nodes 140 coupled to the cluster via a network 130. Note that client nodes may also include nodes 101 within cluster 100. During the interaction of the cluster 100 with client nodes, client nodes may send the cluster 100 requests for access to the data 110 stored in the cluster 100. For example, a client node 140 may request read access to data stored in the cluster 100. Similarly, the client node 140 may request write access to update data 110 already stored in the cluster 100 or to create new data within the cluster 100. In the latter situation, the cluster 100 may determine how to assign new load between its nodes 101. For example, new data may be sent to the node currently storing the least amount of data.

In order to handle client access requests for data within cluster 100, each node 101 may have different responsibilities for the various data sets 110A–110D included in data 110. In one embodiment, each node 101's responsibilities for a particular data set may depend on the current distribution of data 110 and the replication topology. For example, each node 101 may be responsible for responding to client access requests targeting data for which that node is the primary node. In some embodiments, a backup node may also be responsible for responding to certain client access requests (e.g., client-initiated read access requests) targeting data for which that node is the backup node. In other embodiments, backup nodes may not be responsible for responding to client access requests targeting data for which those nodes are backup nodes. For example, backup nodes may only be responsible for responding to access requests that are part of a cluster topology self-healing process and to access requests that keep the backup copy up-to-date with respect to the primary copy. Nodes that are neither primary nor backup nodes for a particular data set may have no responsibilities for that data set. Nodes that lack responsibility for a particular data set may not respond to any client requests targeting that data set. If the targeted data set does not currently exist within the cluster (i.e., if a new data set is being written to the cluster 100), a node 101 may be selected to be the primary node for that data set.

Client access requests targeting data 110 may be received by one of the nodes within the cluster 100 and communicated to a node that is responsible for responding to client access requests targeting that data. For example, if the primary node is responsible for responding to client access requests, requests may be forwarded to the primary node (if the receiving node is not the primary node for the targeted data). In response to a client read access request, the primary node may return a copy of the requested data to the client. When handling client write access requests, the primary node may both update its copy of the targeted data and communicate the write access request to the backup node (or nodes, in embodiments with more than one backup node) so that the backup node can update its copy of the targeted data.

Figure 1C:
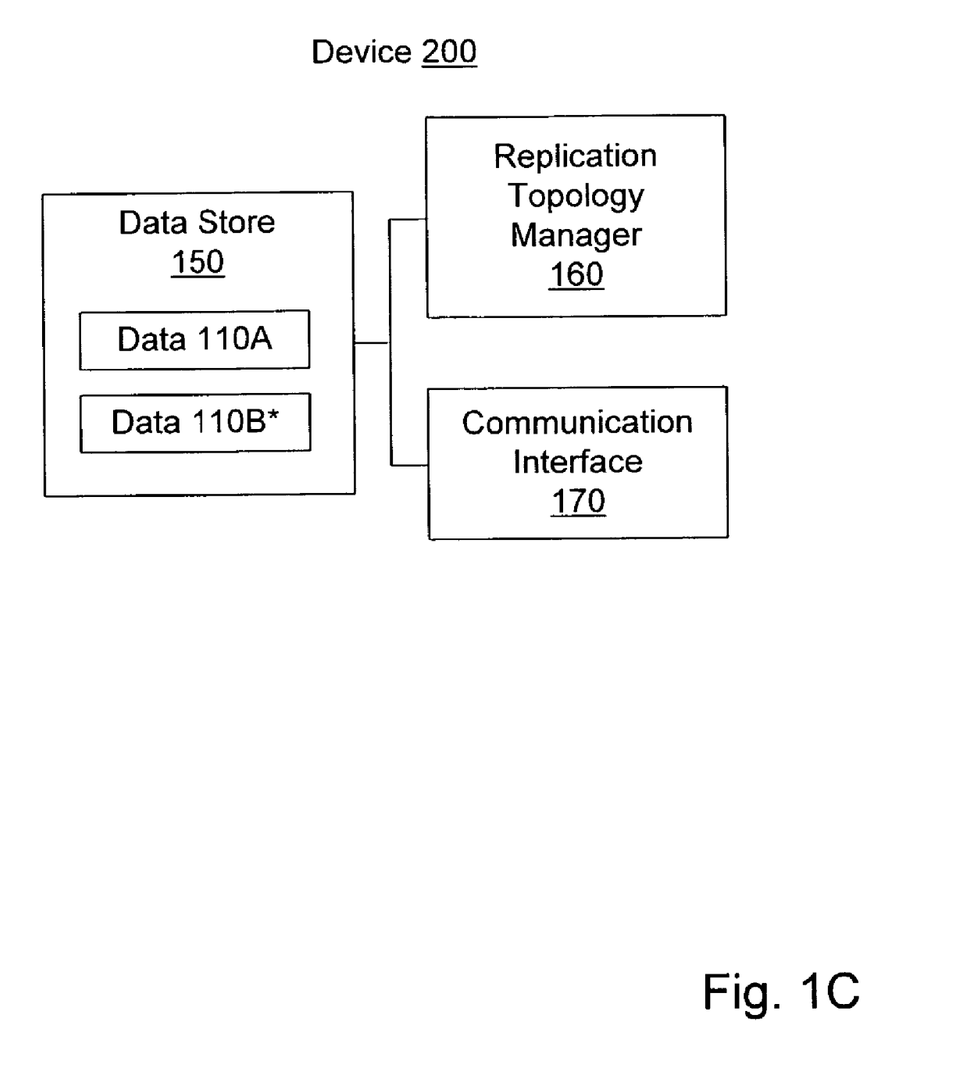
FIG. 1C is a block diagram of a device that may be included in a distributed data system cluster according to one embodiment.

FIG. 1C illustrates an exemplary device that may be included in a distributed data system cluster according to one embodiment. Device 200 may be a node (e.g., a processing device such as a server) within a distributed data system cluster in some embodiments. In other embodiments, processes executing on device 200 may be nodes within a distributed data system cluster. In the illustrated example, device 200 includes node 101A (e.g., node 101A may be a process executing on device 200). Device 200 includes a replication topology manager 160, a data store 150, and a communication interface 170. In this example, the data store 150 includes the physical memory locations storing data sets 110A and 110B\*.

The communication interface 170 may send and receive communications from other nodes. Communication interface 170 may receive client access requests targeting data sets 110A and 110B\*. Since the primary data set 110A is stored by device 200, indicating that device 200 either is or includes the primary node for that data set, communication interface 170 may provide client access requests targeting data set 110A to data store 150. In one embodiment, communication interface 170 may forward any client access requests targeting data set 110B\* to the primary node (e.g., node 101B) for that data set without providing those access requests to data store 150. If an access request is received from the primary node for data set 110B\*, communication interface 170 may provide that access request to data store 150.

The communication interface 170 may also be configured to detect a node failure (e.g., if a node fails to respond to a communication within a predetermined time period or if another node sends a communication identifying a failed node). A node failure may be any event that prevents the failed node from participating in the cluster 100. In one embodiment, a "heartbeat" or ping message may be communicated throughout a cluster to test the status of one or more nodes. Any non-responsive nodes within the cluster may be identified as failed nodes. In one embodiment, a node that neighbors a failed node may further test the status of the failed node (e.g., by sending additional communications to the failed node) to verify that the failed node is not responding. Communication interface 170 may also detect when new nodes (or nodes that previously left the cluster 100 due to failures) enter the cluster 100. Thus, communication interface 170 is one example of a means for detecting a failure of a node included in a distributed data system cluster.

Communication interface 170 may notify replication topology manager 160 whenever changes in cluster membership (i.e., the addition and/or removal of one or more nodes within cluster 100) are detected. The replication topology manager 160 is configured to maintain the distribution of data 110 defined by the replication topology. A replication topology manager 160 may respond to the dynamic additions and/or departures of nodes 101 in cluster 100 by performing one or more copy operations involving data in data store 150 so that the actual replication of data 110 within cluster 100 closely follows that defined by the replication topology.

The replication topology manager 160 may be configured to initiate a copy operation involving a data set for which node 101A is a primary and/or backup node in response to the failure of another node that stores a copy of that data set. For example, node 101A is the primary node for data set 110A. If the backup node 101C for this data set fails, replication topology manager 160 may be configured to identify another node (e.g., node 101B) as a new backup node for data set 110A and to initiate a copy operation to store data set 110A onto that node in order to maintain the ring replication topology illustrated in FIG. 1A. Replication topology manager 160 may initiate such a copy operation by causing communication interface 170 to send a write access request and a copy of data set 110A from data store 150 to node 101B. Alternatively, replication topology manager 160 may be configured to identify node 101A as a new backup node for a data set (e.g., data set 110C\*) in response to the failure of another node (e.g., node 101B) and to responsively initiate a copy operation to read that data set from its primary node (e.g., node 101C). Replication topology manager may cause communication interface 170 to send a read access request specifying data set 110C to node 101C. In general, the replication topology and the non-failed nodes' responsibilities with respect to data stored on a failed node may determine which nodes' replication topology managers initiate a copy operation (e.g., a read from or a write to another node) in response to a node failure. For example, in some embodiments, all copy operations may involve a primary node writing a copy of a data set to a new backup node.

Other embodiments may implement copy operations in which a new backup node reads a copy of a data set from the primary node.

Before initiating a copy operation in response to a node failure, replication topology manager 160 may be configured to wait for the expiration of a timeout period. The replication topology manager 160 may be configured to initiate the timeout period in response to detection of the node failure (e.g., by initiating a countdown timer). The timeout period may begin when communication interface 170 detects a node failure. When the timeout period ends, replication topology manager 160 may initiate the copy operation if the failed node has not returned to the cluster 100. If the failed node has returned to the cluster 100 during the timeout period, the replication topology manager 160 may not perform the copy operation. Thus, the overhead involved in performing the copy operation may be avoided if the failed node returns to the cluster during the timeout period. Replication topology manager 160 is an example of a means for initiating a timeout period and a means for replicating a portion of the data stored on a failed node onto another, non-failed node included in a cluster in response to a timeout period expiring before the failed node returns to the cluster.

Generally, a cluster may be described as performing a cluster topology self-healing process in order to compensate for the failure of a node, regardless of which node(s) within the cluster actually perform a copy operation in order to maintain the data distribution defined by the replication topology. The cluster 100 may be configured to delay performance of a cluster topology self-healing process for a predetermined timeout period after a node failure is detected. Many causes of a node failure may be temporary. Accordingly, a failed node may return to the cluster 100 soon after its failure is detected. Performance of the cluster topology self-healing process within the cluster may affect the load balance of the cluster, use significant bandwidth and other resources, and/or change the relationship between the remaining nodes in the cluster. By delaying performance of the cluster topology self-healing process, the overhead involved in performing the self-healing process may be reduced or avoided if the failed node returns to the cluster 100 before expiration of the timeout period. Similarly, any unbalanced data distributions that might result from performing the self-healing process before the failed node rejoins the cluster may also be avoided if the failed node rejoins the cluster 100 within the timeout period.

Figure 2:
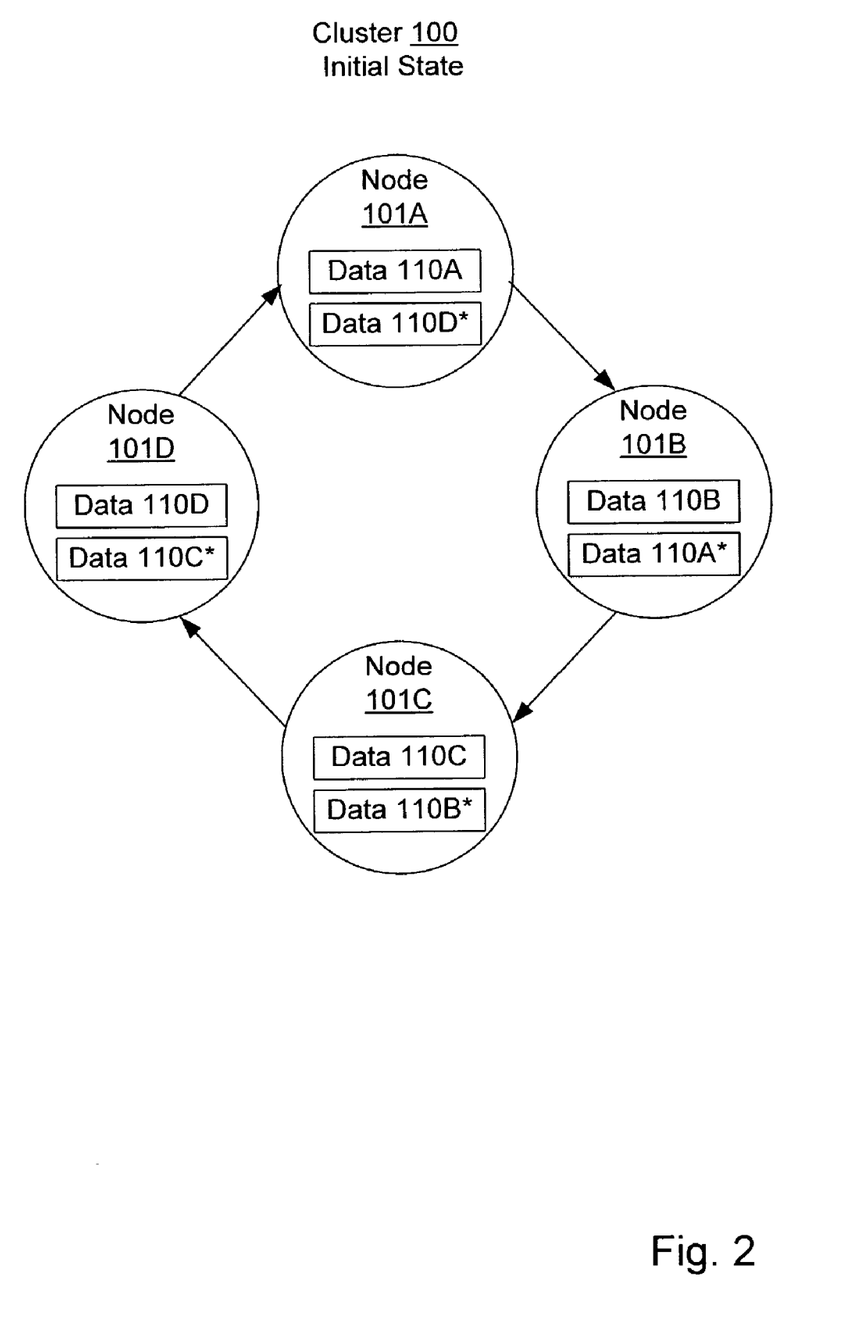
FIG. 2 shows an initial data distribution within one embodiment of a cluster.

FIGS. 2–5 illustrate an embodiment of a cluster 100 that includes four nodes 101. FIG. 2 illustrates an initial state of cluster 100 in which each node 101A–101D is functioning. Data 110 is distributed throughout the cluster according to a replication algorithm in which each node 101 stores a primary data set and a backup copy (identified by an *) of its previous node's primary data set.

A node within cluster 100 may fail. For example, node 101D may fail. Other nodes within cluster 100 may detect node 101D's failure (e.g., if node 101D fails to respond to a communication sent by one of the other nodes). In response to detection of node 101D's failure, cluster 100 may be configured to delay performance of a self-healing process for a timeout period.

Figure 3:
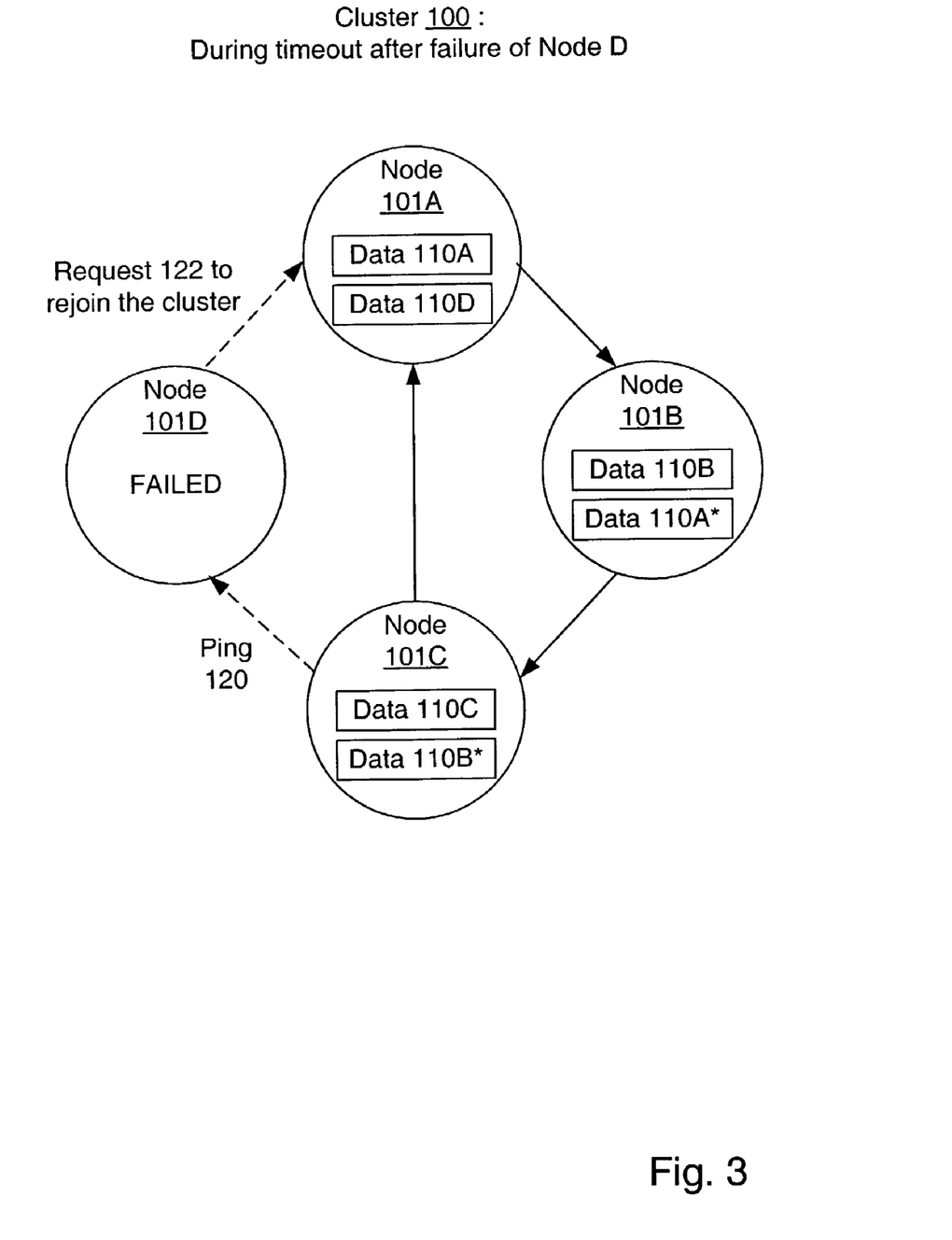
FIG. 3 shows the data distribution within the cluster of FIG. 2 during a timeout period after a node failure, according to one embodiment.

FIG. 3 illustrates cluster 100 during the timeout period initiated in response to the failure of node 101D. Node 101D's failure may result in modified communication patterns within the cluster 100 in order to maintain the logical topology in the absence of node 101D. For example, nodes 101A and 101C are now neighboring nodes (node 101A is now node 101C's next node, and node 101C is now node 101A's previous node). As another result of node 101D's failure, the distribution of data 110 defined by the replication topology is violated because no nodes are storing a backup copy of data set 110C and a primary copy of data set 110D.

One or more nodes may be configured to perform a copy operation involving a data set stored on failed node 101D upon the expiration of a timeout period. For example, in response to the failure of node 101D, node 101C may be configured to store a copy of data set 110C on its next node, which is now node 101A, if node 101D fails to return to cluster 100 before expiration of the timeout period. If node 101D returns to the cluster before expiration of the timeout period, however, none of the other nodes may perform the copy operation.

In one embodiment, each node 101 may initiate a countdown timer in response to detecting the failure of node 101D. The initial value of the countdown timer may correspond to the length of the desired timeout period. If the node has any responsibilities to copy a data set onto another node in response to the failure of node 101D, the node may delay performance of the copy until the countdown timer reaches a minimum value (e.g., zero).

The initial countdown timer value in response to the failure of node 101D may be the same for all nodes 101. Note that in such an embodiment, each node's countdown timer may expire at a different time relative to each other node depending on when each node 101 detects the failure of node 101D. Other embodiments may implement countdown timer synchronization within cluster 100 or provide a centralized countdown timer so that the timeout period is more likely to expire at the same time at each node.

While waiting for the timeout period to expire, the cluster 100 may operate in a degraded state with respect to the data sets 110D and 110C that were stored on failed node 101D. For example, even though the replication algorithm for this example specifies that there should be two copies of each data set within the cluster 100, only one copy of data sets 110D and 110C currently exists within the cluster.

While operating in a degraded mode, there is a possibility that another node failure may occur. Such a node failure may result in data loss. For example, if node 101A fails during the timeout period, the cluster 100 will no longer include a copy of data set 110D. Accordingly, the length of the timeout period may be selected so that cluster 100 is not operating in a degraded mode for an undesirable length of time. The acceptable length of time that a cluster 100 may operate in a degraded mode may vary depending on the number of copies maintained within the cluster (e.g., a cluster whose replication topology stores two backup copies of each data set may acceptably operate in a degraded mode longer than a cluster whose replication topology stores a single backup copy of each data set). Additionally, the acceptable timeout period may vary according to which data stored on the failed node (e.g., some data may be more important and have a shorter timeout period than less important data).

The timeout period may also vary depending on the number of failures that have already occurred within the cluster 100. For example, a cluster may have three copies (one primary, two backup) of a particular data set. If a first node storing one of those copies fail, a relatively lengthy timeout period may be initiated. If, during that timeout period, a second node storing a copy of that data set fails and the first node has not yet returned to the cluster, only one copy of that data set remains in the cluster. In one embodiment, the failure of the second node may result in the immediate redistribution of data within the node (i.e., no timeout period may be initiated in response to the failure of the second node).

In some embodiments, the timeout value may be chosen to correspond to the time needed to perform a warm restart of a node (e.g., so that if a failure is detected because of a warm restart of the failed node, the timeout period will be long enough that the restarted node can return to the cluster before performance of the self-healing process). In other embodiments different factors may be used to select a duration for the timeout. For example, the timeout may be based on average temporary failure times (e.g., average restart times) of nodes, on an average failure time for one or more types of failures, or on a standard timeout value. In one embodiment, the timeout value to use may be dynamically selected and/or changed. For example, a node may select between different timeouts depending on which node failed and/or the type of failure detected.

Note that client access requests targeting data sets 110D and/or 110C may be received while cluster 100 is in the timeout period following node 101D's failure. In one embodiment, the responsibility for responding to client access requests targeting data set 110D may be transferred to a backup node 101A (i.e., node 101A may become the primary node for data set 110D) during the timeout period so that client access requests may be handled during the timeout period. Since the failed node 101D is a backup node for data set 110C*, the primary node 101C may continue to handle client access requests targeting data set 110C during the timeout period.

In some embodiments, the cluster 100 may be configured to verify the failure of node 101D during the timeout period. For example, a failed node's previous node (e.g., node 101C) may be configured to perform the verification of the failed node 101D. In other embodiments, other nodes may participate in the verification. Verification of the failed node may involve a neighboring node 101C sending one or more ping 120 or heartbeat messages to the failed node 101D. If the failed node is not actually failed, it will return a response to the ping or heartbeat message. For example, node 101D may return a response to the ping message to node 101A, which may then communicate the response to the rest of the cluster (e.g., by passing the response to node 101B, which in turn passes the response to node 101C).

Cluster 100 may also be configured to detect the return of node 101D during the timeout period. For example, node 101D may recover from its failure and generate a request 122 to rejoin the cluster. Such a request 122 may be received by one node (e.g., node 101A) and communicated to the other nodes in the cluster 100.

If an indication that the failed node 101D is not actually failed or has returned to the cluster 100 is received during the timeout period, at least some of the cluster topology self-healing process may be avoided. For example, if node 101D returns to the cluster 100 and node 101D's copies of data sets 110D and 110C* are up-to-date with respect to the other copies of those data sets in cluster 100, the cluster 100 may return to the state shown in FIG. 2. In some embodiments, if any node's responsibilities for data sets 110C and/or 110D were modified in response to the failure of node 101D, those responsibilities may be returned to their earlier, pre-failure state. For example, any responsibilities gained by a particular node (e.g., by node 101A with respect to data set 110D) in response to the failure of node 101D may be relinquished and node 101D may regain its original responsibilities. In other embodiments, the responsibilities gained in response to the failure of node 101D may not be relinquished and the failed node 101D may return with lesser or different responsibilities for its data sets (e.g., node 101D may return to cluster 100 as the backup node for both data sets 110C and 110D). In other embodiments, node 101D may return without responsibilities for data sets it previously stored. Instead, node 101D may be configured to act as a primary node for each new data set received by cluster 100 until a roughly even data distribution among nodes 101 is achieved.

Note that in some embodiments, a failed node 101D may return to the cluster 100 within the timeout period but may no longer store a valid and up-to-date copy of each data set stored by the returned node prior to its failure. For example, if a data set (e.g., data set 110C*) stored on returned node 101D is stale (e.g., because node 101C performed a write access to data set 110C in response to a client request received earlier during the timeout period), the master node (e.g., node 101C) for that data set may update the copy stored on node 101D. In many embodiments, nodes 101A and/or 101C may track client access requests that modify data sets 110A and/or 110C during the timeout period, allowing nodes 101A and/or 101C to update node 101D's copy of those data sets (if needed) if node 101D returns to the cluster during the timeout period. For example, node 110A may queue or otherwise record client access requests that modify data set 110A during the timeout period. During that period, node 101A may also perform the requested modifications to its copy of data set 110A. If node 101D returns to cluster 100 during the timeout period, node 101A may, in one embodiment, update node 101D's copy of data set 110A by forwarding the queued requests to node 101D. Alternatively, node 101A may examine the queued requests to determine which portions of data set 110A were modified and responsively write the updated portions to node 101D.

In order to determine whether the data sets 110C* and 110D stored on node 101D are valid, nodes 101A and 101C may send error codes (e.g., error checking and/or correcting codes) corresponding to data sets 110C* and 110D respectively to node 101D. Node 101D may use these error codes to check the validity of data sets 110C* and 110D. If one or both data sets are not valid, node 101D may read up-to-date copies of the invalid data sets from nodes 101A and/or 101C (or nodes 101A and/or 101C may write up-to-date copies of data set(s) 101A and/or 101C to node 101D). In one embodiment, nodes 101A and node 101C may be configured to send copies of data sets 110C and 110D to node 101D without first testing or verifying node 101D's copies of those data sets.

Figure 4:
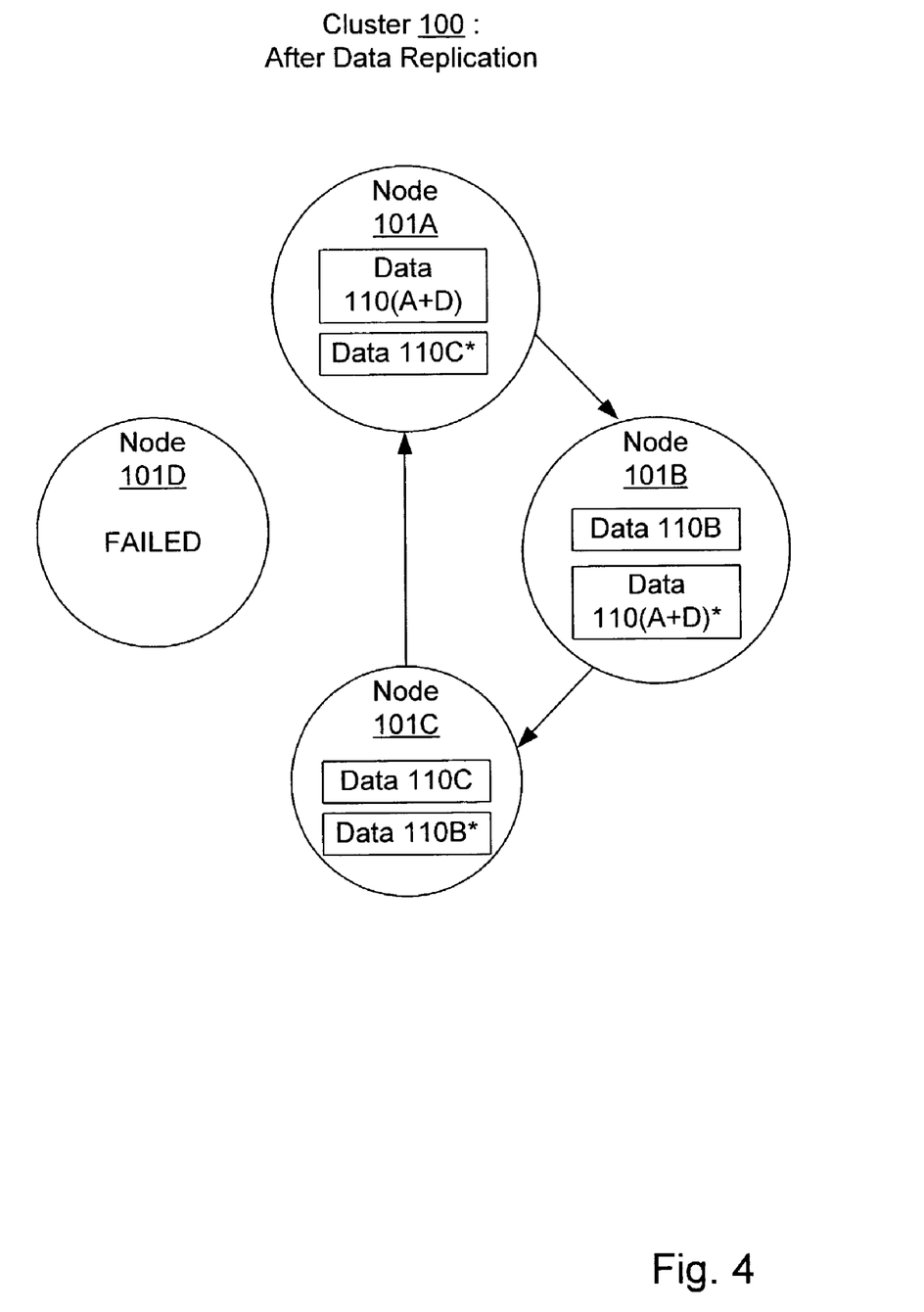
FIG. 4 shows the data distribution within the cluster of FIG. 3 after performance of a self-healing process, according to one embodiment.

FIG. 4 illustrates the state of cluster 100 if node 101D fails to return to the cluster before expiration of the timeout period. In this example, upon expiration of the timeout period, cluster 100 performs the cluster topology self-healing process. As part of the self-healing process, node 101C may perform a copy operation to write a backup copy 110C* of data set 110C on its new next node, node 101A. Alternatively, node 101A may perform the copy operation by reading data set 110C from node 101C. Another part of the cluster topology self-healing process may involve node 101A writing a backup copy of data set 110D onto node 101B. Alternatively, node 101B may perform a copy operation to read data set 110D from node 101A. Note that if data 110 was evenly distributed over the nodes 101 in cluster 100 before node 101D's failure, data 110 may no longer be distributed evenly after the redistribution. Other embodiments may implement replication topologies that provide a roughly even data distribution across each node 101 in the cluster 100 after redistribution. Note that in some embodiments, the replication topology may provide load balancing by distributing data so that each node handles a similar volume of client access requests during a given time.

Figure 5:
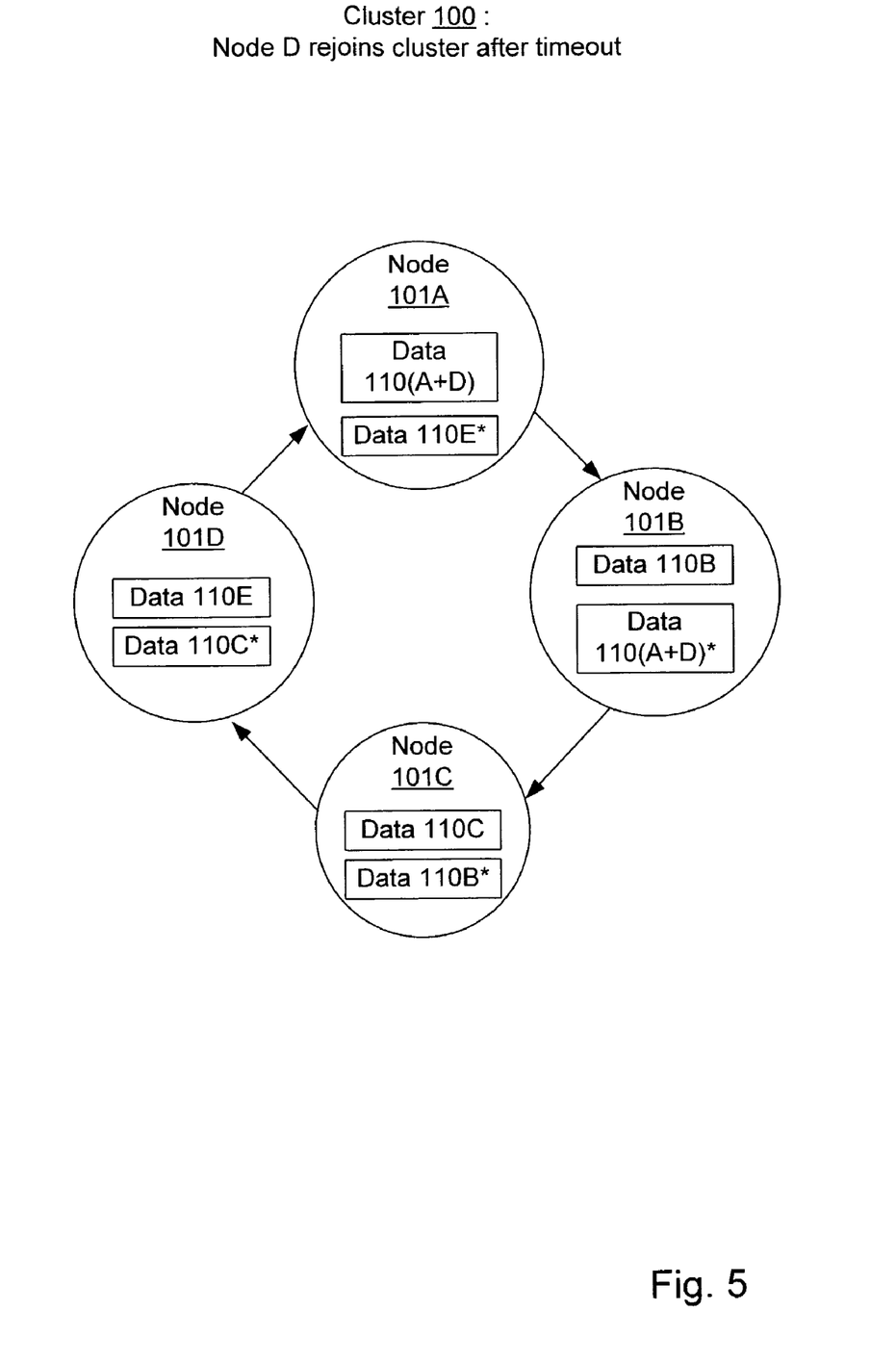
FIG. 5 shows the data distribution within the cluster of FIG. 4 after a node rejoins the cluster, according to one embodiment.

FIG. 5 illustrates the state of cluster 100 if node 101D returns to the cluster 100 after the self-healing process is performed. Since node 101D did not return to the cluster before performance of the self-healing process, node 101D effectively reenters cluster 100 as a new node (note that FIG. 5 may also apply to the situation where a node other than node 101D joins the cluster 100 after the self-healing process). Accordingly, the data sets previously stored on node 101D may be discarded.

As the primary node for data set 110C, node 101C may store a backup copy 110C* on node 101D. In response to node 101D becoming node 101A's new previous node, node 101A may discard its copy of data set 110C (node 101A may wait to do so until it receives an indication that data set 110C has been replicated onto node 101D). If a new data set 101E is received and node 101D becomes the primary node for that data set, node 101D may store a copy of data set 101E on next node 101A.

Figure 6:
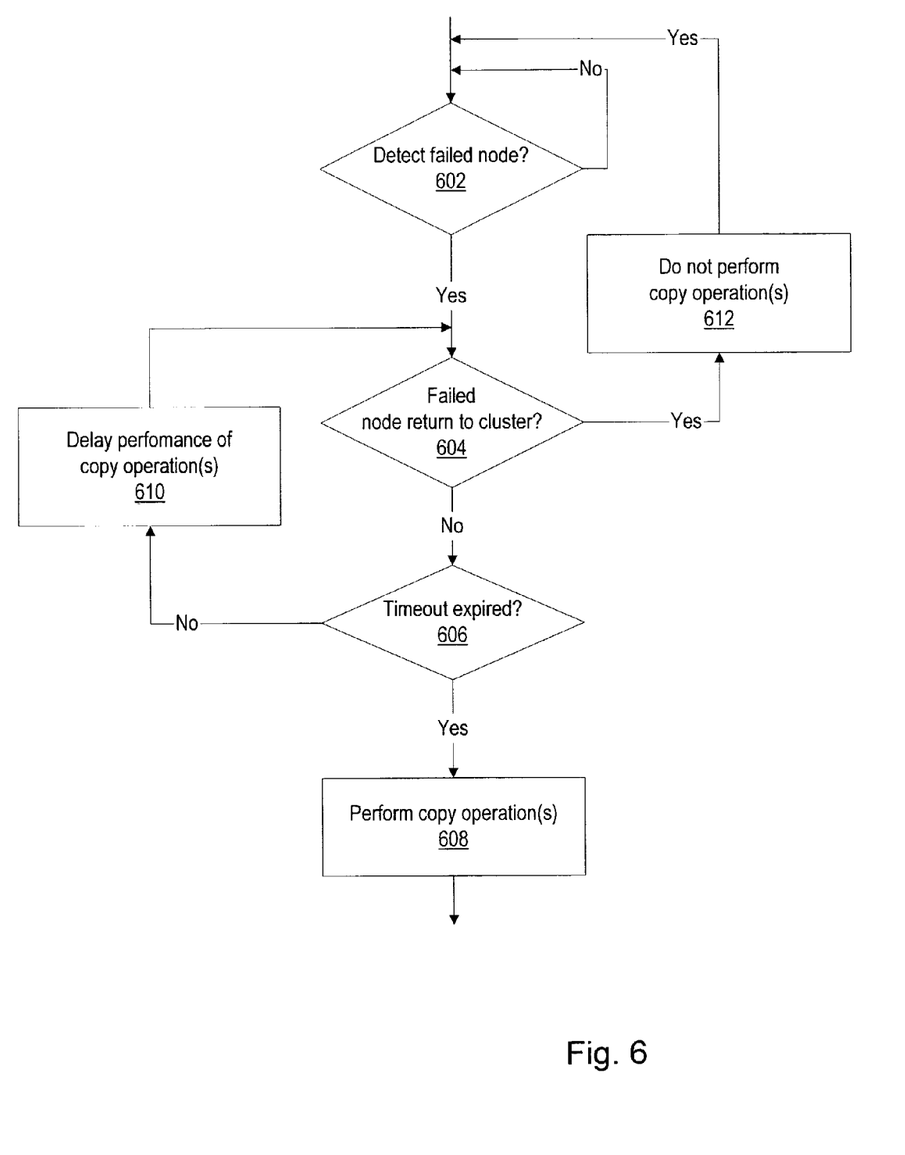
FIG. 6 illustrates one embodiment of a method in which performance of a healing process in a cluster is delayed for a timeout period.

FIG. 6 is a flowchart of one embodiment of a method of operating a distributed data system cluster. A failed node may be detected within the cluster, as shown at 602. One or more nodes in the cluster may detect a failed node. For example, a node may send a communication to a recipient node. The sending node may detect that the recipient node has failed if the recipient node does not respond to the communication within a given time period. The node that detects the failure may communicate the failure to the remaining non-failed nodes in the cluster. Detection of the failed node may cause one or more responsibilities for data stored on the failed node to be reassigned to another node. For example, if the failed node was responsible for responding to client requests targeting data stored on the failed node, this responsibility may be reassigned to a node that, prior to the failure, stored a copy of that data but was not responsible for responding to client requests targeting that data.

In response to detecting the failure of a node, a timeout period may be initiated. For example, a timeout period may be initiated by initializing a countdown timer to a timeout value and enabling the timer. So long as the timeout period has not expired, performance of one or more copy operations involved in a cluster topology self-healing process within the cluster may be delayed, as indicated at 606 and 610.

If the failed node does not return to the cluster before expiration of the timeout period, one or more copy operations may be performed, as shown at 604, 606, and 608. The copy operations may replicate data formerly stored on the failed node onto one or more non-failed nodes in the cluster. In one embodiment, various nodes within the cluster may perform individual portions of the self-healing process. For example, a primary node for a particular data set formerly stored on the failed node may copy that data set onto another node, ensuring that a desired number of copies of that data set are available within the cluster.

If the failed node returns to the cluster before expiration of the timeout period, the cluster may return to its original state, as indicated at 604 and 606 and a self-healing process triggered by the failure may not be performed, as shown at 612. Note that in some embodiments, the cluster may not return to its original state (e.g., various responsibilities may have been modified in response to the failure and/or return of the failed node). Similarly, if data stored on the failed node is stale or invalid when the failed node returns to the cluster, data may be copied from other nodes onto the returned node. However, such actions may often be less expensive than performance of the copy operations involved in the self-healing process. Accordingly, delaying performance of the self-healing process until expiration of the timeout period may benefit cluster performance if failed nodes tend to return to the cluster before expiration of the timeout period.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A distributed data system cluster, comprising:
a plurality of nodes configured to store data as a distributed data cluster, wherein data stored on a first portion of the nodes is replicated on a second portion of the nodes;
an interconnect coupling the plurality of nodes;
wherein in response to detecting a failure of a first node included in the plurality of nodes, a second node included in the plurality of nodes that stores a copy of a data set stored on the first node is configured to:
determine whether the first node returns to the cluster during a timeout period initiated after the failure is detected: and
perform a copy operation for the data set over the interconnect with an other node included in the plurality of nodes if the first node fails to return to the cluster during a timeout period; and
refrain from performing the copy operation for the data set if the first node returns to the cluster during the timeout period.

2. The distributed data system cluster of claim 1, wherein the second node is configured to detect the failure of the first node if the first node fails to respond to a communication within a predetermined time period.

3. The distributed data system cluster of claim 1, wherein the second node is configured to verify the failure of the first node during the timeout period.

4. The distributed data system cluster of claim 1, wherein the timeout period has a duration at least equal to a duration of time required to perform a warm restart of the first node.

5. The distributed data system cluster of claim 1, wherein if the second node is a primary node for the data set, the second node is configured to perform the copy operation by writing the data set to the other node.

6. A method, comprising:
detecting a failure of a first node of a plurality of nodes included in a distributed data system cluster;
in response to said detecting, initiating a timeout period;

if the timeout period expires before the first node returns to the distributed data system cluster, replicating a portion of the data stored on the first node onto a second node included in the plurality of nodes; and if the first node returns to the cluster during the timeout period, maintaining the portion of the data on the first node instead of replicating the portion of the data onto the second node.

7. The method of claim 6, wherein said detecting the failure comprises sending a communication to the first node and not receiving a response to the communication from the first node.

8. The method of claim 6, further comprising verifying the failure of the first node during the timeout period, wherein said verifying comprises sending one or more communications to the first node during the timeout period.

9. The method of claim 6, wherein the timeout period has a duration at least equal to a duration of time required to perform a warm restart of the first node.

10. The method of claim 6, wherein said replicating comprises copying the portion of the data from one or more other nodes storing the portion of the data onto the second node.

11. The method of claim 6, wherein the first node stores a plurality of data sets, and wherein the method comprises copying the plurality of data sets onto one or more of the plurality of nodes.

12. The method of claim 6, further comprising configuring the second node as a new backup node for the portion of the data if the first node is configured as a backup node for the portion of the data;
wherein said replicating comprises copying the data set from a master node for the portion of the data to the new backup node.

13. The method of claim 6, further comprising a third node included in the plurality of nodes responding to client requests targeting the portion of the data during the timeout period;
wherein prior to said detecting the failure, the first node was responsible for responding to client requests targeting the portion of the data.

14. The method of claim 13, further comprising the first node regaining a responsibility to respond to client requests targeting the data if the first node returns to the distributed data system cluster before expiration of the timeout period.

15. The method of claim 13, further comprising the third node losing a responsibility to respond to client requests targeting the data set if the first node returns to the distributed data system cluster before expiration of the timeout period.

16. The method of claim 6, further comprising verifying the data stored on the first node if the first node returns to the distributed data system cluster before expiration of the timeout period.

17. The method of claim 6, further comprising updating the data stored on the first node if the first node returns to the distributed data system cluster before expiration of the timeout period if another node's copy of the data was modified after said detecting the failure and before the first node returns to the distributed data system cluster.

18. A distributed data system, comprising:
a cluster comprising a plurality of nodes, wherein the cluster is configured to store data, and wherein the data is replicated within the cluster;
a client node configured to request access to the data stored on the cluster; and
an interconnect coupling the client node to the cluster;

wherein the cluster is configured to detect a failure of a first node included in the plurality of nodes and to initiate a timeout period in response to detecting the failure of the first node;
wherein if the first node remains failed throughout the timeout period, the cluster is configured to copy a portion of the data stored on the failed node onto one or more other nodes included in the cluster; and
wherein if the first node returns to the cluster during the timeout period, the cluster is configured to maintain the portion of the data on the first node instead of copying the portion of the data onto the one or more other nodes.

19. The distributed data system of claim 18, wherein the cluster is configured to detect the failure of the first node if the first node fails to respond to a communication sent to the first node.

20. The distributed data system of claim 18, wherein the cluster is configured to verify the failure of the first node during the timeout period by sending one or more communications to the first node during the timeout period.

21. The distributed data system of claim 18, wherein the timeout period has a duration at least equal to a duration of time required to perform a warm restart of the first node.

22. The distributed data system of claim 18, wherein the cluster is configured to copy the portion of the data stored on the first node by copying the portion of the data from a plurality of nodes storing the portion of the data onto another plurality of nodes included in the cluster.

23. The distributed data system of claim 18, wherein the portion of the data stored on the first node comprises a plurality of data sets, and wherein the cluster is configured to copy each of the plurality of data sets onto a different one of the one or more other nodes included in the cluster.

24. The distributed data system of claim 18, wherein if the first node is configured as a backup node for the portion of the data stored on the first node, the cluster is configured to:
configure another node included in the cluster as a new backup node for the portion of the data; and
copy the portion of the data from a master node to the new backup node.

25. The distributed data system of claim 18, wherein the cluster is configured to assign a responsibility for responding to client access requests targeting the portion of the data stored on the first node to an other node during the timeout period;
wherein prior to the failure, the first node was responsible for responding to client access requests targeting the portion of the data.

26. The distributed data system of claim 18, wherein the cluster is configured to verify the portion of the data stored on the first node if the first node returns to the cluster before expiration of the timeout period.

27. A device for use in a distributed data system cluster, the device comprising:
a communication interface configured to send and receive communications from one or more other nodes, wherein the communication interface is configured to detect a failed node within the distributed data system cluster and to detect whether the failed node returns to the distributed data system cluster;
a data store coupled to the communication interface and configured to store data; and
a replication topology manager coupled to the communication interface and configured to initiate a timeout period in response to the communication interface detecting the failed node;

wherein if the timeout period expires before the failed node returns to the distributed data system cluster, the replication topology manager is configured to initiate a copy operation for a portion of the data stored in the data store;

wherein if the communication interface detects that the failed node has returned to the distributed data system cluster before expiration of the timeout period, the replication topology manager is configured to not initiate the copy operation.

28. The device of claim 27, wherein in response to the replication topology manager initiating the copy operation, the communication interface is configured to send a read request for the portion of the data to another node within the distributed data system cluster, wherein the communication interface is configured to provide a copy of the portion of the data received in response to the read request to the data store, and wherein the data store is configured to store the copy of the portion of the data.

29. The device of claim 27, wherein in response to the replication topology manager initiating the copy operation, the data store is configured to provide a copy of the portion of the data to the communication interface and the communication interface is configured to send a write request and the copy of the portion of the data to another node within the distributed data system cluster.

30. The device of claim 27, wherein the replication topology manager includes a countdown timer, wherein the replication topology manager is configured to initialize the countdown timer to a timeout value corresponding to a length of the timeout period in response to the communication interface detecting the failed node.

31. A system, comprising:

means for detecting a failure of a first node of a plurality of nodes included in a distributed data system cluster, wherein data is distributed among the plurality of nodes;

means for initiating a timeout period;

means for replicating a portion of the data stored on the first node onto a second node included in the plurality of nodes if the timeout period expires after the failure of the first node is detected and before the first node returns to the distributed data system cluster;

wherein if the first node returns to the cluster during the timeout period, the means for replicating the portion of the data maintain the portion of the data on the first node instead of replicating the portion of the data onto the second node.

* * * * *